(12) United States Patent
Ioannou et al.

(10) Patent No.: US 8,090,169 B2
(45) Date of Patent: Jan. 3, 2012

(54) SYSTEM AND METHOD FOR DETECTING ITEMS OF INTEREST THROUGH MASS ESTIMATION

(75) Inventors: Dimitrios Ioannou, Fremont, CA (US); Todd Gable, Newark, CA (US)

(73) Assignee: Morpho Detection, Inc., Newark, CA (US)

( * ) Notice: Subject to any disclaimer, the term of this patent is extended or adjusted under 35 U.S.C. 154(b) by 1039 days.

(21) Appl. No.: 11/967,487

(22) Filed: Dec. 31, 2007

(65) Prior Publication Data
US 2009/0169051 A1    Jul. 2, 2009

(51) Int. Cl.
G06K 9/00    (2006.01)
G01N 23/00    (2006.01)

(52) U.S. Cl. .......................................... 382/128; 378/4
(58) Field of Classification Search ................ 378/4, 19, 378/901; 382/128, 130–132
See application file for complete search history.

(56) References Cited

U.S. PATENT DOCUMENTS

| | | | |
|---|---|---|---|
| 5,125,015 A | 6/1992 | Shimoni et al. | |
| 5,600,303 A | 2/1997 | Husseiny et al. | |
| 5,600,700 A | 2/1997 | Krug et al. | |
| 5,974,111 A | 10/1999 | Krug et al. | |
| 6,018,562 A | 1/2000 | Willson | |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,128,365 A | 10/2000 | Bechwati et al. | |
| 6,317,509 B1 | 11/2001 | Simanovsky et al. | |
| 6,345,113 B1 | 2/2002 | Crawford et al. | |
| 6,925,200 B2 * | 8/2005 | Wood et al. | 382/132 |
| 7,046,761 B2 | 5/2006 | Ellenbogen et al. | |
| 7,072,501 B2 * | 7/2006 | Wood et al. | 382/132 |
| 7,277,577 B2 | 10/2007 | Ying et al. | |
| 2007/0278423 A1 | 12/2007 | Eikman | |

FOREIGN PATENT DOCUMENTS

| | | |
|---|---|---|
| WO | 00/42566 A1 | 7/2000 |
| WO | 00/42567 A1 | 7/2000 |

* cited by examiner

*Primary Examiner* — Irakli Kiknadze
(74) *Attorney, Agent, or Firm* — Armstrong Teasdale LLP

(57) ABSTRACT

A system and method for identifying an object based on its estimated mass. In one aspect, a method for estimating a mass of an object is provided. The method includes acquiring image data including a plurality of image elements, calculating a histogram based on the image data, calculating a computed tomography (CT) number of the object using an anisotropic erosion operator, and determining a perimeter of the object. The method also includes calculating an estimated mass of the object using the CT number and a first subset of image elements of the plurality of image elements, the first subset of image elements defined by the perimeter of the object, and outputting at least one of the estimated mass of the object and an image including the object.

20 Claims, 9 Drawing Sheets

SYSTEM AND METHOD FOR DETECTING ITEMS OF INTEREST THROUGH MASS ESTIMATION

FIELD OF THE INVENTION

The embodiments described herein relate generally to estimating a mass of an object and, more particularly, to estimating a mass of an object within a container to facilitate detecting contraband concealed within the container.

BACKGROUND OF THE INVENTION

Known identification systems image a container to determine whether explosives, drugs, weapons, and/or other contraband are present within the container. Some known identification systems are configured to detect concealed objects within the container. At least one known method for detecting concealed objects in computed tomography (CT) data includes analyzing a neighborhood of voxels surrounding a test voxel and eroding the CT data by identifying a neighborhood of voxels surrounding a voxel of interest. In such a method, if the number of voxels having densities below a predetermined threshold exceeds a predetermined number, then it is assumed that the test voxel is a surface voxel and is removed from the object. The known method also includes applying a connectivity process to voxels to combine them into objects. A dilation function is then performed on the eroded object to replace surface voxels removed by erosion. However, such known methods may generate false alarms because such methods do not account for a partial volume effect or anisotropic effects. Moreover, such known methods do not utilize one or more histograms to resolve undersegmentation, and do not correct for CT beam hardening.

BRIEF DESCRIPTION OF THE INVENTION

In one aspect, a method for estimating a mass of an object is provided. The method includes acquiring image data including a plurality of pixels, calculating a histogram based on the image data, calculating a computed tomography (CT) number of the object using an anisotropic erosion operator, and determining a perimeter of the object. The method also includes calculating an estimated mass of the object using the object CT number and a first subset of pixels of the plurality of pixels, the first subset of pixels defined by the perimeter of the object, and outputting at least one of the estimated mass of the object and an image including the object.

In another aspect, a system for estimating a mass of an object within a container is provided. The system includes a data collection system and a post-detection classification system operatively coupled to the data collection system. The post-detection classification system is configured to acquire image data representing an image including a plurality of pixels, calculate a histogram based on the image data, calculate a computed tomography (CT) number of the object using an anisotropic erosion operator, and determine a perimeter of the object. The post-detection classification system is also configured to calculate an estimated mass of the object using the object CT number and a first subset of pixels of the plurality of pixels defined by the perimeter of the object, and output at least one of the estimated mass of the object and an image including the object.

In still another aspect, a computer program embodied on a computer-readable medium is provided. The computer program includes a code segment that configures a processor to acquire image data representing an image, the image data including a plurality of pixels, calculate a histogram based on the image data, calculate a computed tomography (CT) number of the object using an anisotropic erosion operator, and determine a perimeter of the object. The code segment also configures a processor to calculate an estimated mass of the object using the object CT number and a first subset of pixels of the plurality of pixels defined by the perimeter of the object, and output at least one of the estimated mass of the object and an image including the object.

BRIEF DESCRIPTION OF THE DRAWINGS

FIG. 1 is a block diagram of an exemplary embodiment of a post-detection classification system.

FIG. 2 is a flowchart of an exemplary embodiment of a method for estimating a mass of an object that may be used with the system shown in FIG. 1.

FIG. 3 is a histogram that illustrates undersegmented image data.

FIG. 4 is a histogram that illustrates proper segmentation.

FIG. 5 is a histogram of object image data after a first iteration using an anisotropic erosion operator.

FIG. 6 is a histogram of object image data after three iterations using the anisotropic erosion operator.

FIG. 7 is a histogram of object image data after a first iteration using the dilation operator.

FIG. 8 is a histogram of object image data after a second iteration using the dilation operator.

FIG. 9 is a histogram of object image data after a third iteration using the dilation operator.

DETAILED DESCRIPTION OF THE INVENTION

Figure 1:
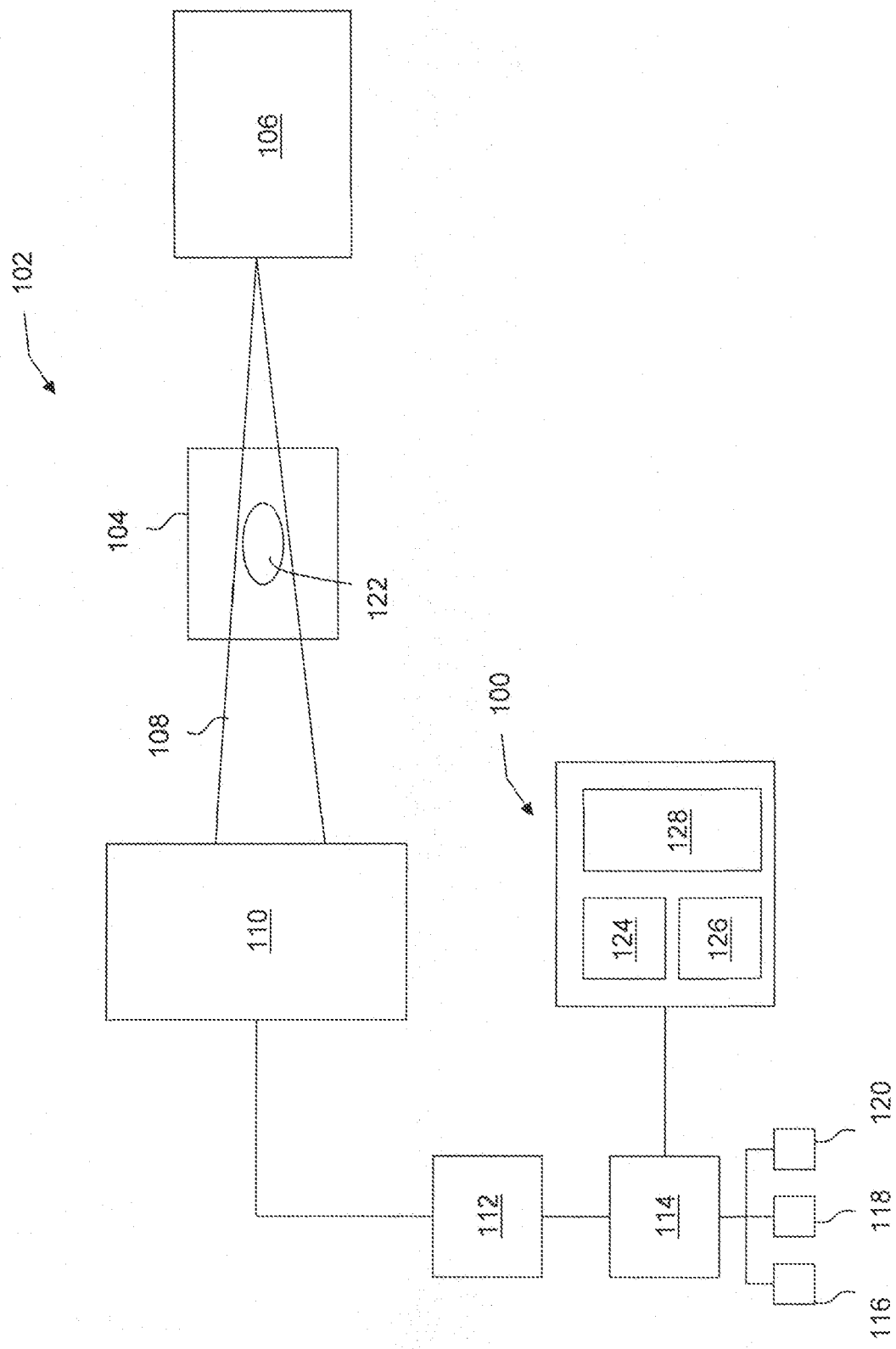
FIGS. 1-9 show exemplary embodiments of the system and method described herein.

The embodiments described herein provide a system and method for processing the output of an imaging system that includes a detection and/or classification component for determining or estimating the mass of an object. In one embodiment, a post-detection classification system receives images from an imaging system. Using image elements that make up the images, such as pixels or voxels, the post-detection classification system estimates the mass of an object. A technical effect of the systems and methods described herein is to reduce the occurrence of false alarms by discriminating the mass of a detected object. An embodiment of a method uses morphological operators, such as erosion and dilation, and a histogram-based descriptor to estimate the mass of an object and to classify the object as contraband based on the mass and a size of the object and/or a shape of the object. Embodiments of the systems and methods described herein may be used to reduce false alarms associated with, for example, sheet-like shapes, such as random aggregations of voxels and/or pixels, by discriminating between thin objects and sheet-like objects according to the object masses.

At least one embodiment of the present invention is described below in reference to its application in connection with and operation of a system for inspecting cargo. However, it should be apparent to those skilled in the art and guided by the teachings herein provided that the invention is likewise applicable to any suitable system for scanning cargo containers including, without limitation, crates, boxes, drums, baggage, containers, luggage, and/or suitcases transported by water, land, and/or air, as well as other containers and/or objects.

Moreover, although embodiments of the present invention are described below in reference to its application in connection with and operation of a system incorporating an X-ray computed tomography (CT) scanning system for inspecting cargo, it should be apparent to those skilled in the art and guided by the teachings herein provided that any suitable radiation source including, without limitation, neutrons or gamma rays, may be used in alternative embodiments. Further, it should be apparent to those skilled in the art and guided by the teachings herein provided that any security scanning system may be used that produces a sufficient number of pixels and/or voxels to enable the functionality of the post-detection classification system described herein. For example, the system and method described may be used for automatic detection of thin structures in volumetric data in any other suitable application including, without limitation, medical imaging.

As used herein, the term "thresholding" refers generally to a method of segmentation for use in image processing, which refers generally to a process of partitioning an image into multiple regions. In general, an image element, such as a pixel and/or a voxel, in an image is marked as an "object" element if its value is greater than a selected threshold. The image element is marked as a "background" element if its value is less than the threshold. The threshold may be chosen according to various methods. For example, a mean or median value may be calculated from among all of the image elements of the image, and the mean or median value may then be used as the threshold. Another example is to create a histogram of the densities of all of the image elements of the image and use the valley point of the histogram as the threshold.

When segmenting, or partitioning, an image into multiple regions, undersegmentation may occur. As used herein, the term "undersegmentation" refers generally to when multiple objects having different densities are segmented together.

In addition, as used herein, the term "partial volume" refers generally to when an image element, such as a pixel or a voxel, represents multiple types of material. Partial volume effects blur the distinction between objects that are in contact and have similar density values. For example, a soft-cover book and a magazine that are positioned flat against each other in a container may have similar density values, as measured by a scanning system. The boundary between the book and the magazine may be difficult for the scanning system to discern, based only on their respective densities, because the image elements on either side of the boundary have similar density values. As such, a subset of the image elements may be analyzed to determine whether each image element within the subset is part of the book or the magazine.

The influence of the book image element densities and the magazine image element densities on such a subset of image elements due to partial volume effects may be addressed, at least in part, by using morphological operators during image processing. One such morphological operator is "dilation," which, as used herein, refers generally to adding image elements to the object under investigation. Neighboring image elements of the image elements belonging to the object are added to the group of image elements to be processed in order to determine one or more characteristics of the object. Another such morphological operator is "erosion," which, as used herein, refers generally to removing image elements, such as pixels and/or voxels, from the object under investigation. Neighboring image elements of the image elements belonging to the object are removed from the group of image elements to be processed in order to determine one or more characteristics of the object.

Moreover, the dilation and erosion operators may be either isotropic or anisotropic with respect to the material of the object. As used herein, the term "isotropic" refers generally to material properties that are identical in all directions within the object. Conversely, the term "anisotropic" refers generally to material properties that are dependent on a direction of travel within the object when determining the material properties. For example, in a piece of wood, a series of lines travel in one direction, which is known as "with the grain." Wood is generally stronger with the grain than "against the grain," which is in any direction within the wood other than with the grain. Because strength is a property of the wood and depends on direction within the wood, strength is an anisotropic property. Similarly, the densities associated with individual image elements may vary according to direction. Moreover, pixel sizes within an object may vary according to direction.

In addition, as used herein, the term "beam hardening" refers generally to a tendency of an X-ray beam emitted by an X-ray source to become more penetrating, or harder, as it traverses through matter. In general, X-rays in energy ranges that are easily attenuated are referred to as "soft X-rays," and X-rays in energy ranges that are more penetrating are referred to as "hard X-rays." Thus, beam hardening is a removal of soft X-rays from an X-ray beam, making the X-ray beam harder and more penetrating. Beam hardening may cause artifacts in CT images, making image processing more prone to errors.

FIG. 1 is a block diagram of an exemplary post-detection classification system 100 used with an X-ray computed tomography (CT) scanning system 102 (also referred to herein as an "imaging system") for scanning a container 104, such as a cargo container, box, parcel, luggage, or suitcase, to identify the contents and/or determine the type of material contained within container 104. The term "contents" as used herein refers to any object and/or any material contained within container 104 and may include contraband.

In one embodiment, scanning system 102 includes at least one X-ray source 106 configured to transmit at least one primary beam 108 of radiation through container 104. In an alternative embodiment, scanning system 102 includes a plurality of X-ray sources 106 configured to emit radiation of different energy distributions. Alternatively, each X-ray source 106 is configured to emit radiation of selective energy distributions, which can be emitted at different times. In a particular embodiment, scanning system 102 utilizes multiple-energy scanning to obtain an attenuation map for container 104. In addition to the production of CT images, multiple-energy scanning enables the production of density maps and/or atomic number information of the object contents. In one embodiment, the dual energy scanning of container 104 includes inspecting container 104 by scanning container 104 at a low energy and then scanning container 104 at a high energy. The data is collected for the low-energy scan and the high-energy scan to reconstruct the CT, density, and/or atomic number images of container 104 to facilitate identifying the type of material within container 104 based on the material content of container 104 to facilitate detecting contraband concealed within container 104, as described in greater detail below.

In one embodiment, scanning system 102 also includes at least one X-ray detector 110 configured to detect radiation emitted from X-ray source 106 and transmitted through container 104. X-ray detector 110 is configured to cover an entire field of view or only a portion of the field of view. Upon detection of the transmitted radiation, X-ray detector 110 generates a signal representative of the detected transmitted radiation. The signal is transmitted to a data collection system and/or processor as described below. Upon detection of the transmitted radiation, each X-ray detector element generates a signal representative of the detected transmitted radiation. The signal is transmitted to a data collection system and/or processor as described below. Scanning system 102 is utilized to reconstruct a CT image of container 104 in real time, non-real time, or delayed time.

In one embodiment of scanning system 102, a data collection system 112 is operatively coupled to and in signal communication with X-ray detector 110. Data collection system 112 is configured to receive the signals generated and transmitted by X-ray detector 110. A processor 114 is operatively coupled to data collection system 112. Processor 114 is configured to produce or generate one or more images of container 104 and its contents and to process the produced image(s) to facilitate determining the material content of container 104. More specifically, in one embodiment, data collection system 112 and/or processor 114 produces at least one attenuation map based upon the signals received from X-ray detector 110. Utilizing the attenuation map(s), at least one image of the contents is reconstructed and a CT number, a density, and/or an atomic number of the contents is inferred from the reconstructed image(s). Based on these CT images, density and/or atomic maps of container 104 can be produced. The CT number, density, and/or atomic number images are analyzed to infer the presence of contraband including, without limitation, explosives and/or explosive material.

In alternative embodiments of scanning system 102, one processor 114 or more than one processor 114 may be used to generate and/or process the container image(s). In the exemplary embodiment, scanning system 102 also includes a display device 116, a memory device 118 and/or an input device 120 operatively coupled to data collection system 112 and/or processor 114. As used herein, the term "processor" is not limited to only integrated circuits referred to in the art as a processor, but broadly refers to a computer, a microcontroller, a microcomputer, a programmable logic controller, an application specific integrated circuit and any other programmable circuit. Processor 114 may also include a storage device and/or an input device, such as a mouse and/or a keyboard.

During operation of one embodiment of scanning system 102, X-ray source 106 emits X-rays in an energy range, which is dependent on a voltage applied by a power source to X-ray source 106. A primary radiation beam 108 is generated and passes through container 104, and X-ray detector 110, positioned on the opposing side of container 104, measures an intensity of primary radiation beam 108.

Images generated by scanning system 102 are then processed by post-detection classification system 100 to determine whether container 104 includes suspected contraband. More specifically, post-detection classification system 100 uses the data within the images to identify objects, such as object 122, within container 104 as a sheet object and/or a bulk object. In the exemplary embodiment, post-detection classification system 100 includes one or more processors 124 electrically coupled to a system bus (not shown). Post-detection classification system 100 also includes a memory 126 electrically coupled to the system bus such that memory 126 is communicatively coupled to processor 124. Post-detection classification system 100 also includes a display device 128, which may be, but is not limited to being, a monitor (not shown), a cathode ray tube (CRT) (not shown), a liquid crystal display (LCD) (not shown), and/or any other suitable output device that enables system 100 to function as described herein. Post-detection classification system 100 may also include a storage device and/or an input device, such as a mouse and/or a keyboard. In the exemplary embodiment, the results of post-detection classification system 100 is output to a memory, such as memory 126, a drive (not shown), a display device, such as display device 128, and/or any other suitable component.

Figure 2:
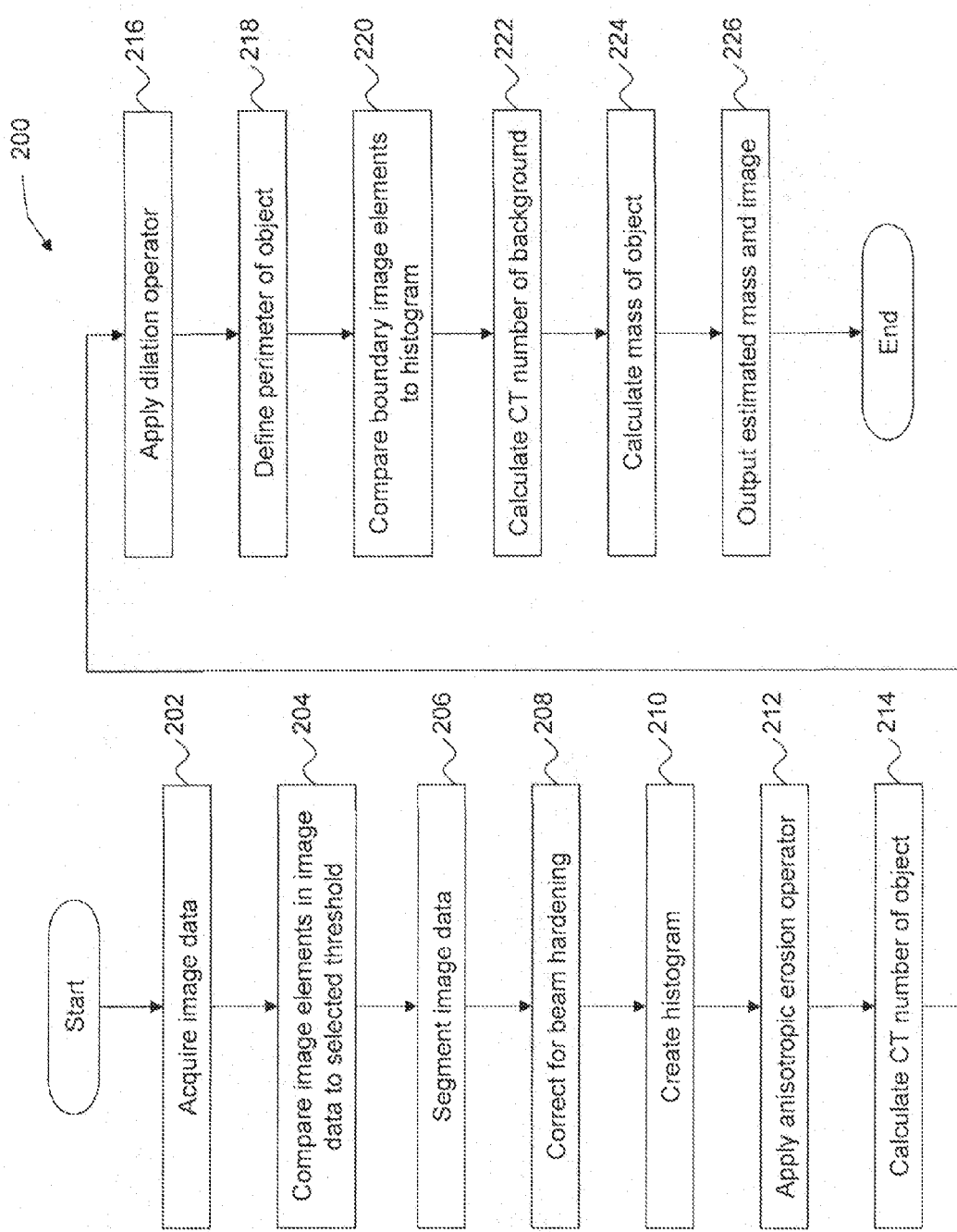

FIG. 2 shows a flowchart illustrating a method 200 for estimating a mass of object 122 (shown in FIG. 1) using post-detection classification system 100 (shown in FIG. 1). In the exemplary embodiment, method 200 is implemented on system 100 and/or system 102. However, method 200 is not limited to being implemented on system 100 and/or system 102. Rather, method 200 may be embodied on a computer readable medium as a computer program, and/or implemented and/or embodied by any other suitable means. The computer program may include a code segment that, when executed by a processor, configures the processor to perform one or more of the functions of method 200. Method 200 may be used with a three-dimensional image including voxels and/or a two-dimensional image including pixels. As used herein, the term "image element" refers to an element, such as a pixel and/or a voxel, within image data.

In the exemplary embodiment, post-detection classification system 100 receives original image data acquired 202 by scanning system 102 (shown in FIG. 1). The original image data represents an image of an object, such as container 104 (shown in FIG. 1), that has been scanned by scanning system 102. In the exemplary embodiment, the original image data is segmented based on a comparison 204 of the image elements in the image data to a selected threshold. In one embodiment, the threshold value is a median value of the CT numbers of all of the image elements of the original image data. Each image element is compared to the median value and, based on the comparison, is defined an object image element or a background image element. In an alternative embodiment, the threshold value is a mean value of the CT numbers of all of the image elements of the original image data. Each image element is compared to the mean value and, based on the comparison, is defined an object image element or a background image element. Other alternative embodiments may use different threshold values as the basis for segmenting the original image data. Using the comparison of each image element to the selected threshold, the original image data is segmented 206 into a plurality of image segments.

Figure 3:
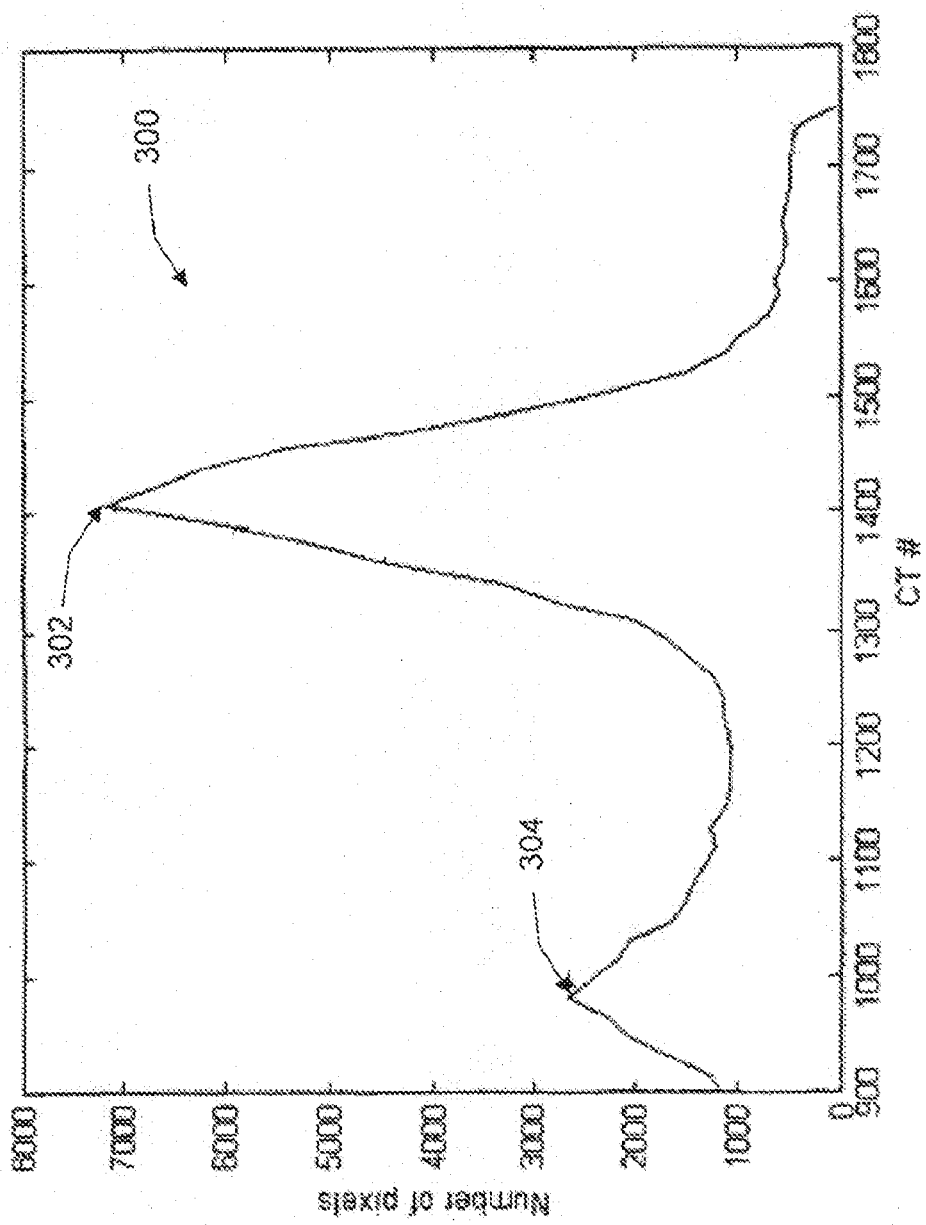
Figure 4:
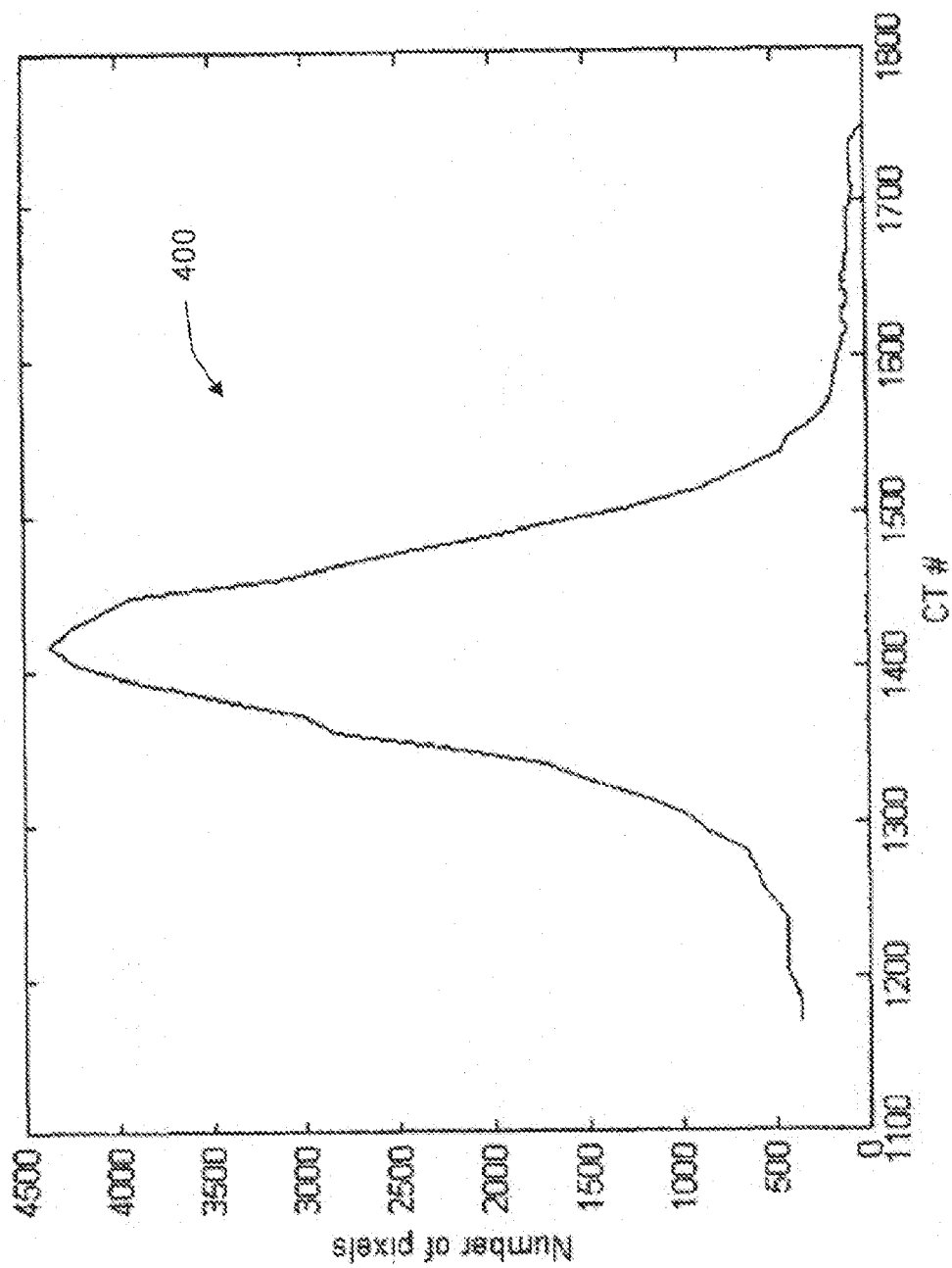

FIG. 3 is a histogram 300 that illustrates undersegmented image data. As used herein, the term undersegmentation refers generally to segmenting together multiple objects having different densities and/or CT numbers. A first peak 302 represents a first object, such as object 122. A second peak 304 represents a second object that is located adjacent to the first object. It is desirable to segment each object 122 separately in order to obtain a more accurate estimate of the mass of each object 122 using method 200. To prevent undersegmentation, and referring again to FIG. 2, a histogram is created 210. In one embodiment, creating the histogram includes applying 208 a beam hardening correction factor to the histogram. As described above, beam hardening may cause artifacts in CT images, making image processing more prone to errors. FIG. 4 is a histogram 400 that illustrates proper segmentation.

Figure 5:
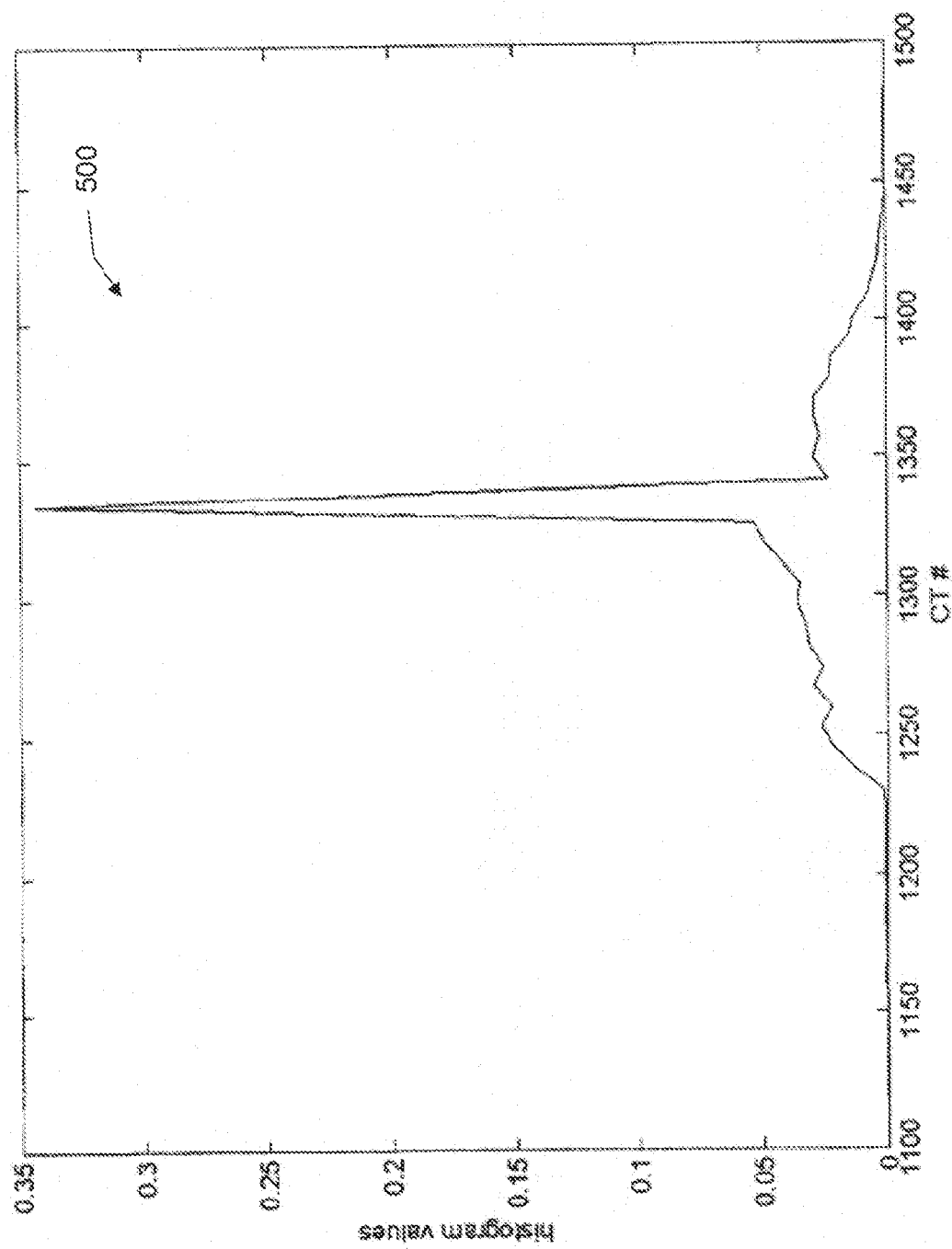
Figure 6:
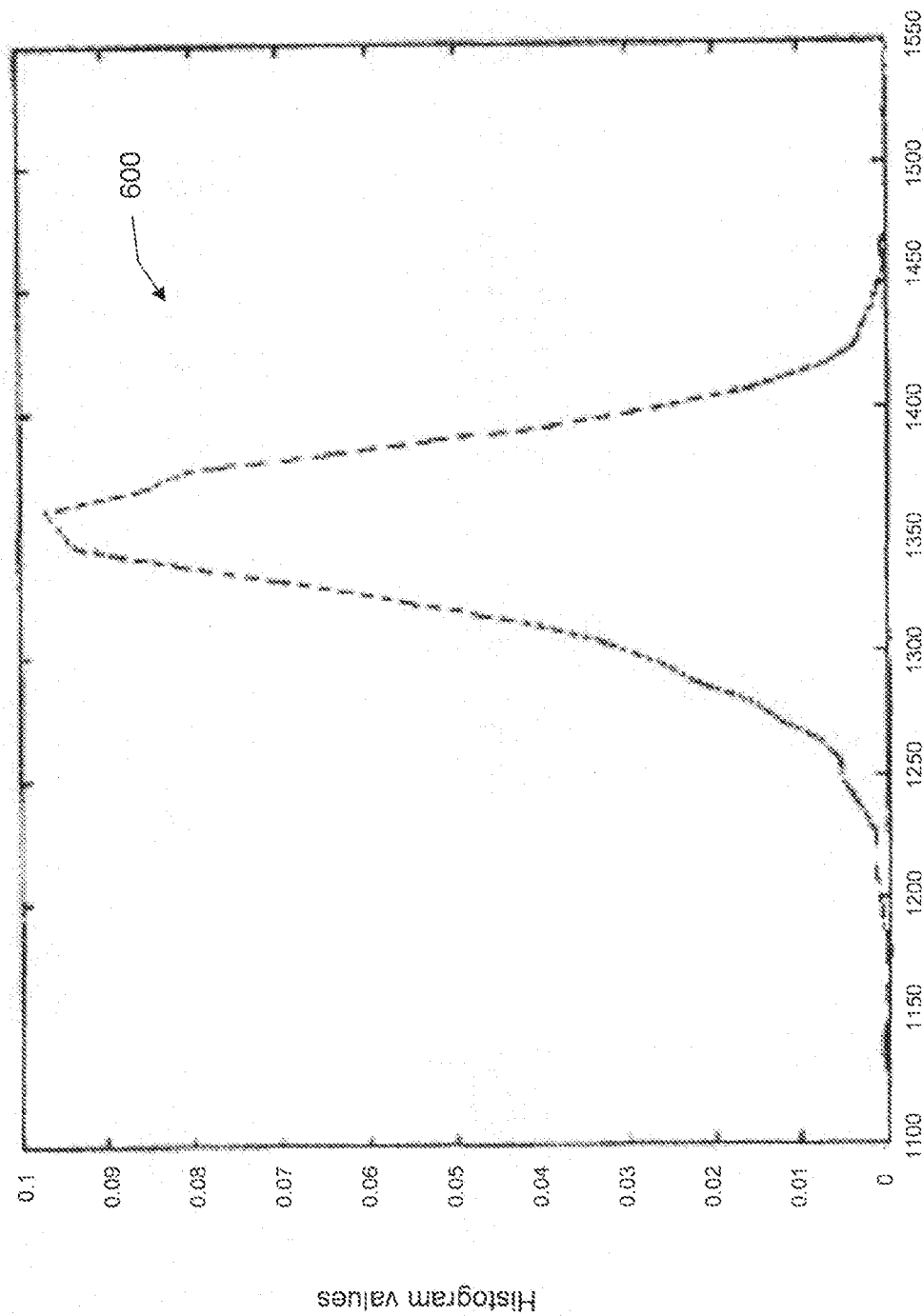

Referring again to FIG. 2, once the histogram has been created, post-detection classification system 100 addresses partial volume effects. As described above, the term "partial volume effects" refers generally to when an image element, such as a pixel or a voxel, represents multiple types of material. Partial volume effects blur the distinction between objects that are in contact and have similar density values. Partial volume effects may be addressed, at least in part, by using morphological operators during image processing. One example of such a morphological operator is erosion, which refers generally to removing image elements, such as pixels and/or voxels, from the object under investigation. In the exemplary embodiment, post-detection classification system 100 calculates the CT number of the object by applying 212 an erosion operator to the object image data. Specifically, at least one iteration of an anisotropic erosion operator is applied to the object image data. In a particular embodiment, the anisotropic erosion operator is applied through multiple iterations to the object image data. The number of iterations of the anisotropic erosion operator depends on, for example, a size of each image element within the original image data and/or the object image data, a size of X-ray detector 110 (shown in FIG. 1), and/or other geometric factors of the original image data and/or the object image data. An anisotropic erosion operator is used due to the anisotropic nature of image element sizes within the original image data and/or object image data. As described above, anisotropic properties vary along a given direction within a material or set of data. A comparison of the eroded object image data and the histogram enables post-detection classification system 100 to calculate 214 the CT number of the object image data, which is defined by a first subset of image elements. As such, FIG. 5 is a histogram 500 of the object image data after a first iteration using the anisotropic erosion operator. FIG. 6 is a histogram 600 of the object image data after three iterations using the anisotropic erosion operator.

Figure 7:
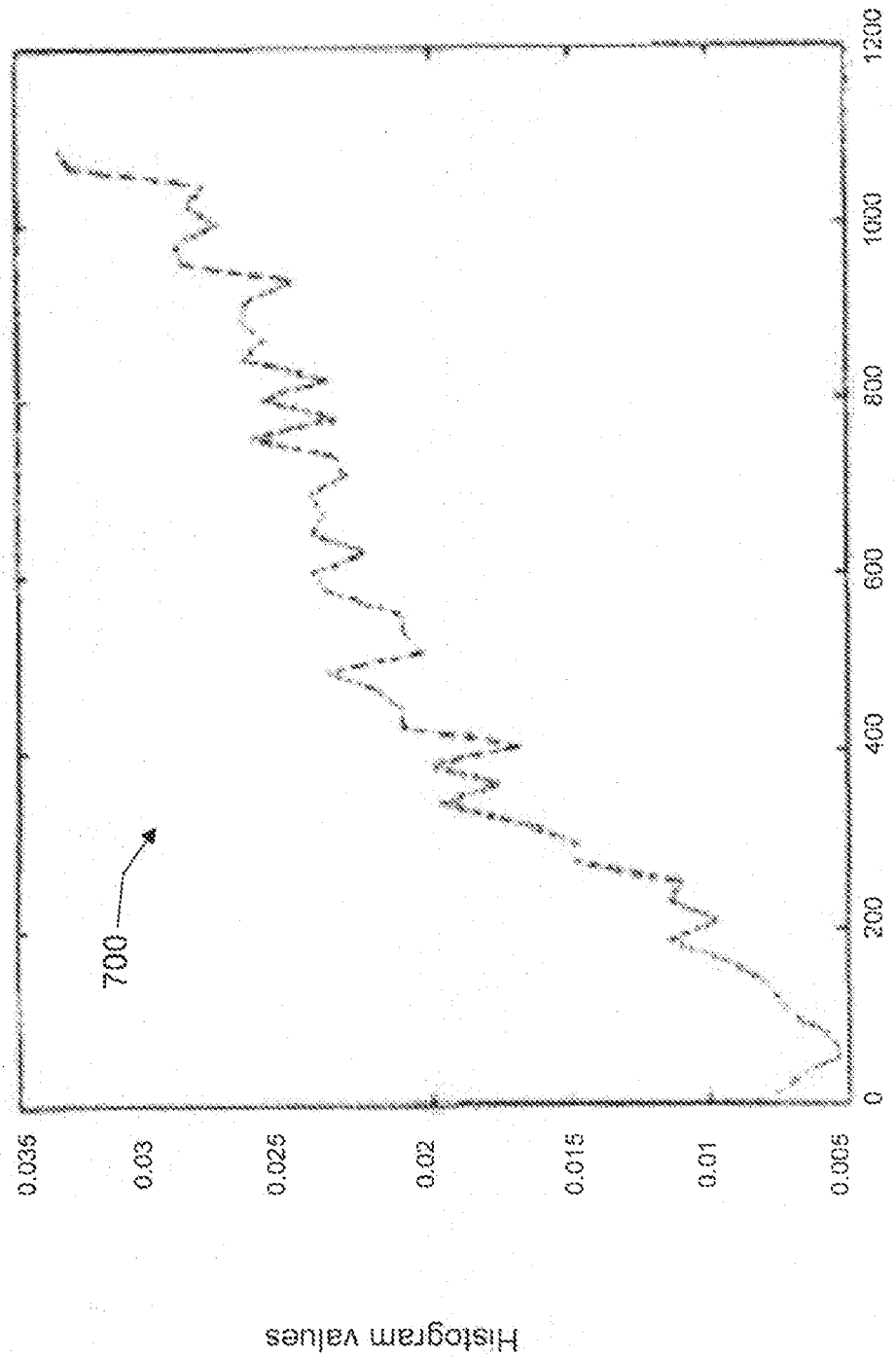
Figure 8:
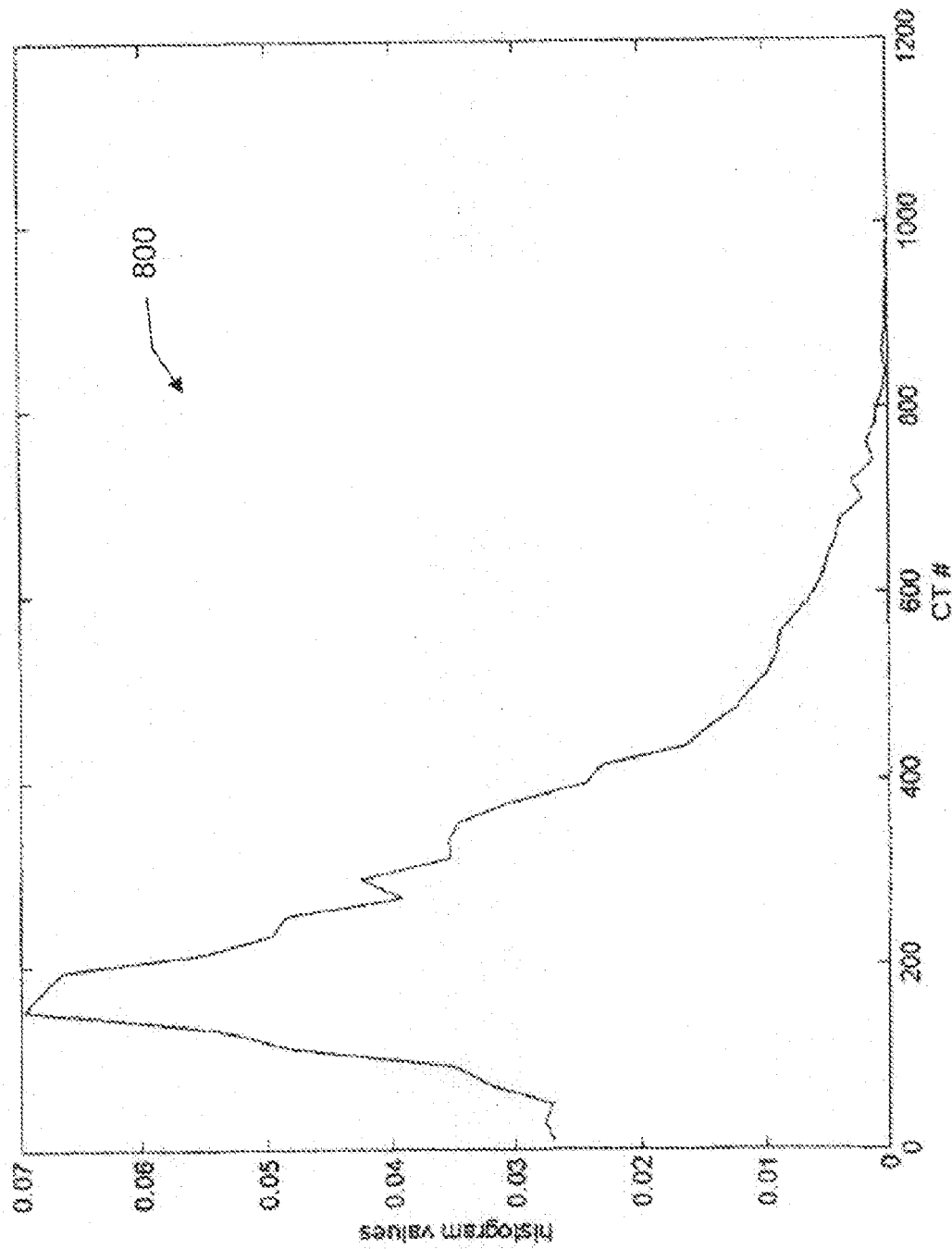
Figure 9:
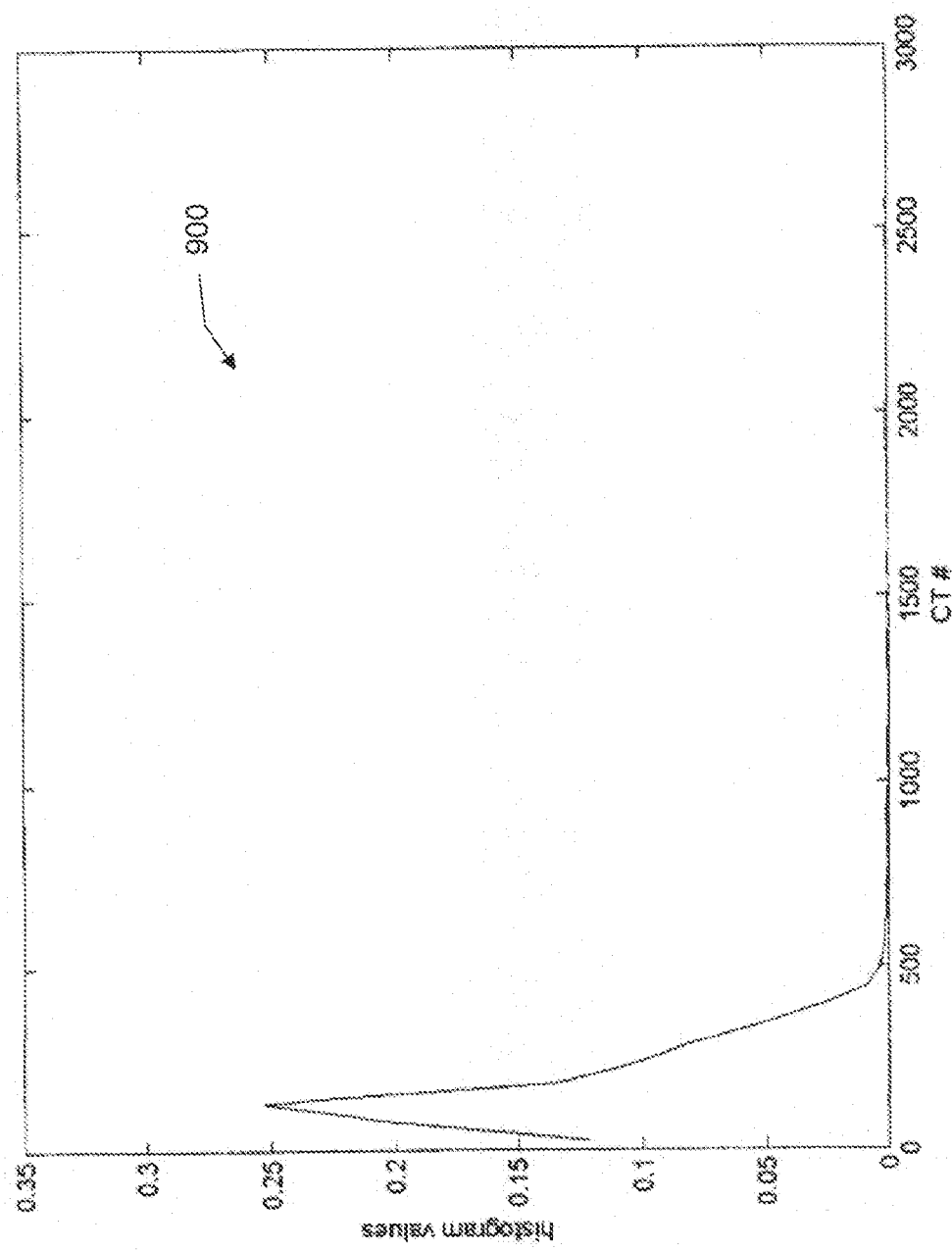

After the CT number of the object image data has been calculated, post-detection classification system 100 then applies 216 a dilation operator to the object image data. As described above, a dilation operator adds image elements to the object under investigation in order to determine one or more characteristics of the object. In one embodiment, the dilation operator is applied to the object image data at least once. In a particular embodiment, the dilation operator is applied to the object image data for the same number of iterations that the anisotropic erosion operator was applied to the object image data. In the exemplary embodiment, the dilation operator is anisotropic. As such, FIG. 7 is a histogram 700 of the object image data after a first iteration using the dilation operator. FIG. 8 is a histogram 800 of the object image data after a second iteration using the dilation operator. FIG. 9 is a histogram 900 of the object image data after a third iteration using the dilation operator.

As shown in FIGS. 7-9, applying the dilation operator facilitates determining a second subset of image elements that is not included in the object image data. More specifically, and referring again to FIG. 2, a boundary between the first subset of image elements and the second subset of image elements defines 218 a perimeter of the object image data that separates the object image data from background image data. As such, the first subset of image elements defines the object image data, and the second subset of image elements defines the background image data. However, in order to determine a true perimeter separating the object image data from the background image data, a third subset of image elements is defined and analyzed. The third subset of image elements is defined by the subset of image elements that is influenced by the first subset of image elements and the second subset of image elements due to partial volume effects. Initially, a ring having a width of three image elements is formed around each image element within the third subset of image elements. The CT number of each image element within the ring is compared 220 to the histogram to calculate 222 the CT number of the background image data, or the second subset of image elements. Thereafter, for each image element within the third subset of image element, a fit is performed in a region of all image elements that are influenced by partial volume effects between the object image data and the background image data. In one embodiment, the region is cubic. Alternative embodiments may include regions of different shapes and/or volumes. Performing the fit for the image elements influenced by partial volume effects facilitates obtaining a more accurate estimate of the mass of object 122 by including image elements in the calculation that are actually part of object 122.

When the object image data, or the first subset of pixels, and the background image data, or the second subset of pixels, are separated as described above, the estimated mass of object 122 is calculated 224. Specifically, the original image data generated by processor 114 (shown in FIG. 1) includes a size of the image elements within the image data. For example, a three-dimensional image includes a known size of the voxels making up the image. In addition, the CT number of the object is now known, using the above-described steps, and is an approximation of the density of object 122. To obtain the estimated, or approximate, mass of object 122, the CT number is multiplied by the number of image elements within the object image data.

Moreover, the results of method 200 are output 226 to a memory, such as memory 128 (shown in FIG. 1), a drive, a display device, such as display device 130 (shown in FIG. 1), and/or any other suitable component. In one embodiment, an estimated mass of object 122 and an image including object 122 is output 226 such that the estimated mass is displayed to an operator and/or stored in computer-readable memory.

While the invention has been described in terms of various specific embodiments, those skilled in the art will recognize that the invention can be practiced with modification within the spirit and scope of the claims.

What is claimed is:

1. A method for estimating a mass of an object, said method comprising:
   acquiring image data including a plurality of image elements;
   calculating a histogram based on the image data;
   calculating a computed tomography (CT) number of the object using an anisotropic erosion operator;
   determining a perimeter of the object;
   calculating an estimated mass of the object using the CT number and a first subset of image elements of the plurality of image elements, the first subset of image elements defined by the perimeter of the object; and
   outputting at least one of the estimated mass of the object and an image including the object.

2. A method in accordance with claim 1, further comprising segmenting the acquired image data into a plurality of image segments.

3. A method in accordance with claim 2, wherein segmenting the image data comprises comparing each image element of the plurality of image elements to a selected threshold value.

4. A method in accordance with claim 1, wherein calculating a histogram based on the image data comprises applying a beam hardening correction factor to the histogram.

5. A method in accordance with claim 1, wherein calculating a CT number of the object comprises applying the anisotropic erosion operator using at least one iteration, a number of iterations is based on at least one of a mean pixel size of the plurality of pixels and a size of an X-ray detector having generated the image data.

6. A method in accordance with claim 1, wherein determining a perimeter of the object comprises determining a second subset of image elements of the plurality of image elements, the perimeter defined by a boundary between the first subset of image elements and the second subset of image elements.

7. A method in accordance with claim 6, further comprising:

applying a dilation operator to the first subset of image elements; and calculating a CT number of the second subset of image elements.

8. A method in accordance with claim 6, wherein determining a perimeter of the object further comprises:

determining a third subset of image elements of the plurality of image elements, each image element of the third subset of image elements is influenced by partial volume effects due to at least one of the first subset of image elements and the second subset of image elements;

comparing each image element of the third subset of image elements to the histogram; and redefining each image element of the third subset of image elements as an image element of one of the first subset of image elements and the second subset of image elements.

9. A system for estimating a mass of an object within a container, said system comprising:

a data collection system; and a post-detection classification system operatively coupled to said data collection system, said post-detection classification system configured to:

acquire image data representing an image, the image data including a plurality of image elements;

calculate a histogram based on the image data;

calculate a computed tomography (CT) number of the object using an anisotropic erosion operator;

determine a perimeter of the object;

calculate an estimated mass of the object using the CT number and a first subset of image elements of the plurality of image elements, the first subset of image elements defined by the perimeter of the object; and output at least one of the estimated mass of the object and an image including the object.

10. A system in accordance with claim 9, wherein said post-detection classification system is further configured to segment the acquired image data into a plurality of image segments.

11. A system in accordance with claim 9, wherein said post-detection classification system is further configured to calculate a histogram based on the image data by applying a beam hardening correction factor to the histogram.

12. A system in accordance with claim 9, wherein said post-detection classification system is further configured to calculate the CT number by applying the anisotropic erosion operator using at least one iteration, a number of iterations is based on a mean image element size of the plurality of image elements and a size of an X-ray detector having generated the image data.

13. A system in accordance with claim 9, wherein said post-detection classification system is further configured to:

determine a perimeter of the object by determining a second subset of pixels of the plurality of image elements, the perimeter defined by a boundary between the first subset of image elements and the second subset of image elements, the second subset of image elements is determined by applying a dilation operator to the first subset of image elements; and calculate a CT number of the second subset of image elements.

14. A system in accordance with claim 13, wherein said post-detection classification system is further configured to:

determine a third subset of image elements of the plurality of image elements, each image element of the third subset of image elements is influenced by partial volume effects due to at least one of the first subset of image elements and the second subset of image elements;

compare each image element of the third subset of image elements to the histogram; and redefine each image element of the third subset of image elements as an image element of one of the first subset of image elements and the second subset of image elements.

15. A computer program embodied on a non-transitory computer-readable medium, said computer program comprising a code segment that configures a processor to:

acquire image data representing an image, the image data including a plurality of calculate a histogram based on the image data;

calculate a computed tomography (CT) number of the object using an anisotropic erosion operator;

determine a perimeter of the object;

calculate an estimated mass of the object using the CT number and a first subset of image elements of the plurality of image elements, the first subset of image elements defined by the perimeter of the object; and output at least one of the estimated mass of the object and an image including the object.

16. A computer program embodied on a non-transitory computer-readable medium in accordance with claim 15, wherein the code segment further configures the processor to segment the acquired image data into a plurality of image segments.

17. A computer program embodied on a non-transitory computer-readable medium in accordance with claim 15, wherein the code segment further configures the processor to calculate a histogram based on the image data by applying a beam hardening correction factor to the histogram.

18. A computer program embodied on a non-transitory computer-readable medium in accordance with claim 15, wherein the code segment further configures the processor to calculate the CT number by applying the anisotropic erosion operator using at least one iteration, a number of iterations is based on a mean image element size of the plurality of image elements and a size of an X-ray detector having generated the image data.

19. A computer program embodied on a non-transitory computer-readable medium in accordance with claim 15, wherein the code segment further configures the processor to:

determine a perimeter of the object by determining a second subset of image elements of the plurality of image elements, the perimeter defined by a boundary between the first subset of image elements and the second subset of image elements, the second subset of image elements is determined by applying a dilation operator to the first subset of image elements; and calculate a CT number of the second subset of image elements.

20. A computer program embodied on a non-transitory computer-readable medium in accordance with claim 19, wherein the code segment further configures the processor to:

determine a third subset of image elements of the plurality of image elements, each image element of the third subset of image elements is influenced by partial volume effects of at least one of the first subset of image elements and the second subset of image elements;

compare each image element of the third subset of image elements to the histogram; and redefine each image element of the third subset of image elements as an image element of one of the first subset of image elements and the second subset of image elements.

* * * * *